(12) United States Patent
Glover, II

(10) Patent No.: US 6,316,707 B1
(45) Date of Patent: Nov. 13, 2001

(54) BRASS MUSICAL INSTRUMENT TRAINING DEVICE

(76) Inventor: Kenneth S. Glover, II, 375 Hayfield Dr., Dora, AL (US) 35062

( * ) Notice: Subject to any disclaimer, the term of this patent is extended or adjusted under 35 U.S.C. 154(b) by 0 days.

(21) Appl. No.: 09/712,102

(22) Filed: Nov. 14, 2000

(51) Int. Cl.⁷ .................................................. G01D 7/10
(52) U.S. Cl. ........................ 84/387 A; 84/327; 84/453; 84/421
(58) Field of Search ............................... 84/387 A, 327, 84/421, 453; 211/85.6, 85.7

(56) References Cited

U.S. PATENT DOCUMENTS

| | | | |
|---|---|---|---|
| 3,117,482 | * | 1/1964 | Sporny ................................ 84/387 A |
| 3,192,817 | * | 7/1965 | Schmidt ................................ 84/327 |
| 4,909,123 | * | 3/1990 | Butenschon, III ..................... 84/382 |
| 4,986,158 | * | 1/1991 | Johnson ................................ 84/327 |
| 5,894,098 | * | 4/1999 | Hsieh .................................. 84/387 A |

* cited by examiner

*Primary Examiner*—Shih-Yung Hsieh
(74) *Attorney, Agent, or Firm*—Russell Carter Gache Sirote & Permutt, P.C.; R. Sandidge

(57) ABSTRACT

A training device for brass instrument musicians is disclosed which prevents the musician from exerting excess pressure to his lips by using the mouthpiece. The device includes a central piece for holding the brass instrument that limits movement of the instrument in a direction along the longitudinal axis of the mouthpiece towards the user's lips and further includes upper and lower portions with connecting support rods for securing the position of the central piece so that the mouthpiece cannot be pressed against the user's lips. In one disclosed embodiment the device includes upper and lower portions designed to contact the musician's head and body, thereby fixing the proximity of the central piece to the user's lips.

40 Claims, 3 Drawing Sheets

BRASS MUSICAL INSTRUMENT TRAINING DEVICE

FIELD OF THE INVENTION

The present invention relates generally to a device that assists in training a brass instrument musician to correctly use the embouchure muscles. More particularly, this invention relates to a device that may be used by a brass instrument musician to prevent applying excess pressure between the mouthpiece of the instrument and the musician's lips so that the proper muscles must be used to produce the desired sound.

BACKGROUND OF THE INVENTION

Brass musical instruments have been in existence for hundreds of years. Brass instruments may be found in a large variety of shapes and sizes with the most common being the trumpet, trombone, cornet, tuba, french horn, etc. A musician creates sound on a brass instrument by using his own lips in combination with the mouthpiece as the resonator, while the shape of the instrument acts as an amplifier creating the desired sound. The speed of the musician's lip vibration combined with the shape of the horn creates the different pitches available with the brass instrument. In addition, the keys of the brass instrument (or in the case of a trombone, the sliding piece) serve to modify the horn chamber in such a way as to alter the pitch of the sound.

The mouthpieces of most brass instruments are generally the same shape, although they vary in size depending upon the size of the horn. A brass instrument mouthpiece is somewhat conical in shape having a round or opening where the musician's lips are placed and then narrowing down to a small stem that enters the horn. The shape of the mouthpiece helps create the initial vibration that is then amplified by the instrument. The musician's lip vibration combined with the mouthpiece shape creates the initial resonance that creates sound.

Many volumes of literature have been written about the proper use of the lips to create the desired vibration for brass instruments. For example, Risen Publishing produces a book entitled *Ultimate Position* which describes the well-known Stevens/Costello method of positioning the embouchure muscles to provide the most consistent lip vibration for obtaining the desired pitch for a trumpet. Similar use of the embouchure muscles is necessary for other brass instruments. Many other books, pamphlets, and teaching aids discuss the proper positioning of the embouchure muscles to obtain the desired lip vibration for playing a brass instrument.

One common problem that beginning musicians encounter is a lack of strength in the embouchure muscles, particularly those muscles supporting the upper lip. This lack of strength translates into an inability to create the desired lip vibration. Many beginning musicians compensate for this lack of strength by increasing the pressure of the mouthpiece against the lips, which in turn enables them to achieve better lip vibration. However, this excessive mouthpiece pressure leads to lip numbing and related problems that severely limit the amount of time that the musician can play his instrument. In addition, the excessive mouthpiece pressure will inhibit the proper development of the embouchure muscles which in turn will limit the musician's ability.

With conscientious practice, the musician will learn to substitute air pressure and muscular resistance for mouthpiece pressure in order to increase the speed of the lip vibrations. So as not to choke off the air column on a high, fast, and narrow vibration, there is a point at which the mouthpiece pressure must cease, while air and muscular tension increase to create the desired vibration. The lips cannot defend themselves against heavy mouthpiece weight unless they are properly trained to work without mouthpiece pressure. If a musician continually practices with the improper mouthpiece pressure, then the embouchure muscles will never develop properly.

Until the development of the present invention, there has been no way for an instructor to prevent a pupil from exerting excessive pressure with the mouthpiece with the exception of watching the pupil play and keeping a wary eye for improper technique. Of course, once the student is left to practice on his own nothing other than the student's own initiative will ensure that proper embouchure muscles are utilized. The training of a musician's embouchure muscles would be greatly enhanced if a device existed that would prevent the musician from applying excess pressure with the mouthpiece, while still allowing for normal play of the instrument.

Thus there is a need for a device that may will enable a musician to properly play a brass instrument, while preventing the musician from creating excessive pressure between the mouthpiece of the instrument and the musician's lips.

SUMMARY OF THE INVENTION

The present invention is for positioning a musical instrument of the brass horn family so that a user avoids excessive pressure between the user's lips and the mouthpiece of the instrument comprising a central section that holds the instrument and restricts movement of the instrument along the longitudinal axis of the mouthpiece and upper and lower sections that contact the user's head and body, respectively, and substantially limit the ability of the instrument to approach the user's lips.

In another embodiment of this invention, the upper and lower sections are adjustable with respect to the central section so that the device may be modified to fit different sized musicians.

In another embodiment of this invention, the central section and the upper and lower portions are made of a sturdy, lightweight plastic such as hardened polyurethane, and the connections between the upper and lower portions and the central section are made of a lightweight metal such as aluminum.

In yet another embodiment of the invention, the sturdy, lightweight plastic central section and upper and lower portions are connected by lightweight aluminum rods, such that the horizontal and vertical positions of the upper and lower portions may be adjusted with respect to the central section.

In still another embodiment of the present invention, the device comprises a central section that restricts the movement of the instrument along the longitudinal axis of the mouthpiece which is connected to at least two support rods. The support rods are attached to upper and lower connecting pieces, and the central section is movable along the support rods. The upper and lower connecting pieces are attached to upper and lower portions of the device via extension rods in the upper and lower portions. The extension rods may be moved in and out of the connecting pieces to provide horizontal adjustability.

Another embodiment of the present invention is a device for positioning a musical instrument comprised of means for securing the instrument to limit the movement of the instrument along the longitudinal axis of the mouthpiece, including means for preventing the securing means from approaching the users lips.

Other features and objects and advantages of the present invention will become apparent from a reading of the following description as well as a study of the appended drawings.

DESCRIPTION OF THE PREFERRED EMBODIMENTS

The present invention is a device that is intended to prevent a brass instrument musician from applying excessive pressure to his lips with the instrument's mouthpiece while playing the instrument. This is intended as a training device that may be used by beginners to develop their embouchure muscles, or may also be used by experienced musicians who believe that their embouchure muscles could benefit from further development. For purposes of this specification, the terms "brass instrument," "brass musical instrument," and "brass horn" all have the same meaning, namely, any instrument that is considered by those skilled in the art to be part of the brass instrument family.

Figure 1:
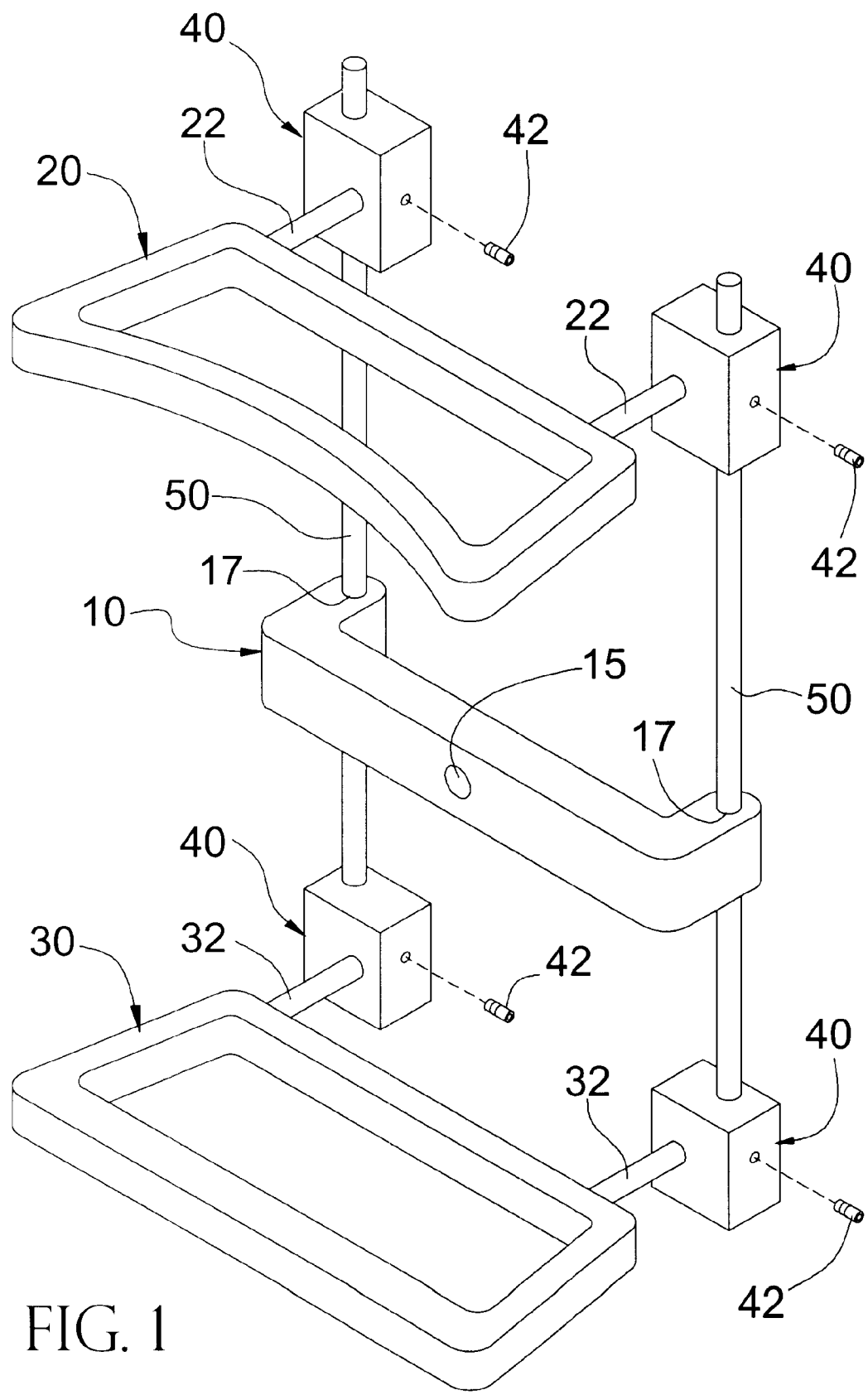
FIG. 1 is a drawing of one embodiment of the present invention.

Referring now to FIG. 1, one embodiment of the present invention is shown. In this embodiment the brass instrument will be placed in the central section 10 by fitting the unattached mouthpiece through hole 15 and then attaching the horn to the mouthpiece on the other side of central section 10. Upper portion 20 is designed to contact the musician's head and lower portion 30 is designed to contact the musician's body, and thereby restrict the movement of the mouthpiece toward the user's lips. Connecting pieces 40 allow the device to be adjusted so that the upper and lower portions 20, 30 may be adjusted both horizontally and vertically with respect to the central section 10. In this way the device may be adjusted to fit users of various sizes.

Figure 2:
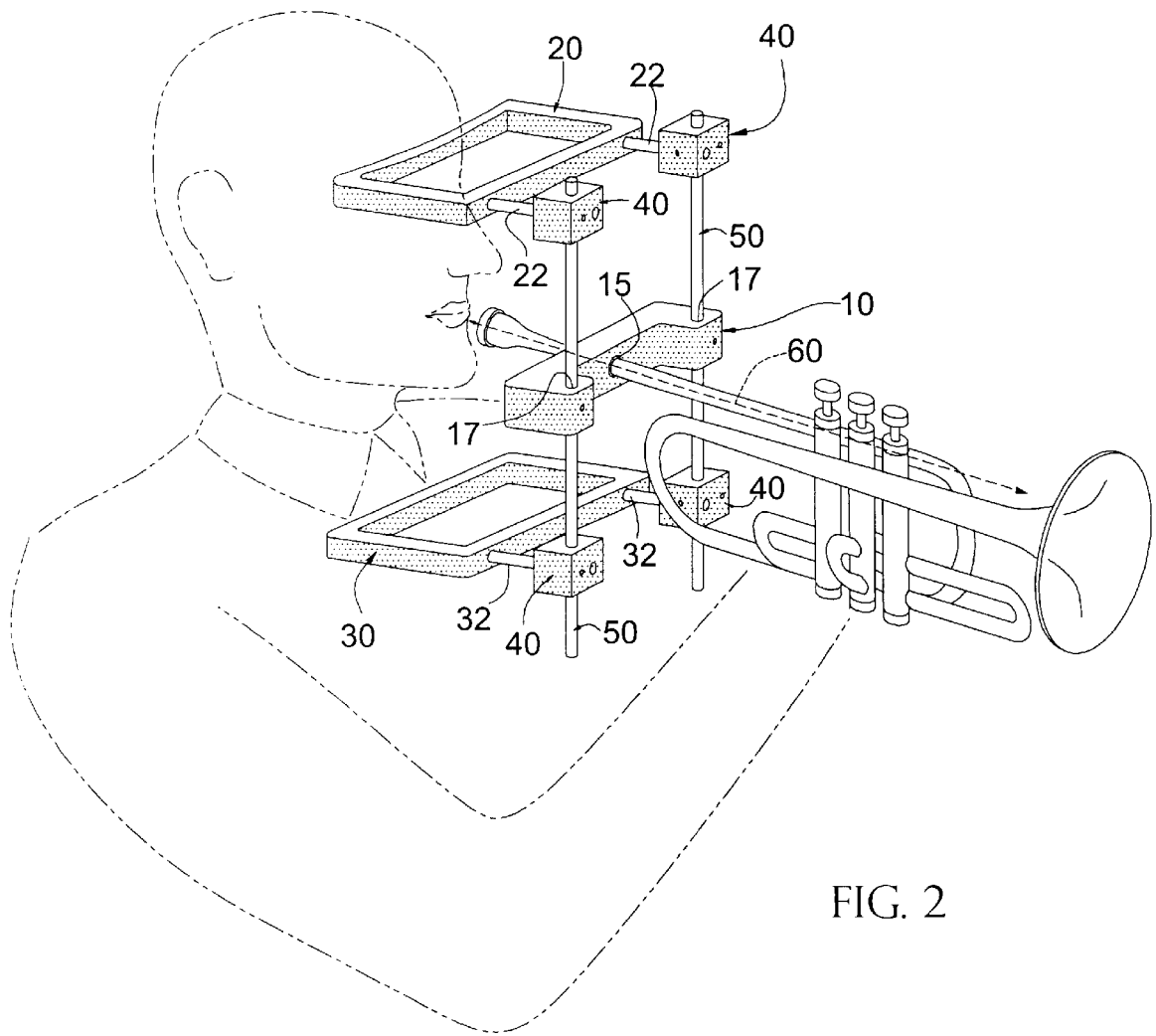
FIG. 2 is a drawing of the embodiment of FIG. 1 being used by a musician.

Turning now to FIG. 2, the device is shown being used by a musician. As discussed above, the musical instrument's mouthpiece is placed inside hole 15 of central section 10. The hole limits the amount of movement allowed along the longitudinal axis 60 of the instrument's mouthpiece. By "longitudinal axis of the instrument's mouthpiece" it is meant the axis 60 delineated in FIG. 2 which travels along the direction that air is intended to travel through the mouthpiece. As shown, upper portion 20 contacts the musician's head, while lower portion 30 contacts the user's body. The rigid connections between the upper and lower portions 20, 30 and the central section 10 prevent central section 10 from being pressed too closely to the user's face. This in turn will limit the position of the mouthpiece relative to the user's lips. If the device is adjusted properly, the user may utilize his embouchure muscles to contact the mouthpiece and create the proper sound, but will be prevented from pressing the mouthpiece too tightly against the lips to assist in creating lip vibration. In this manner the embouchure muscles should properly develop over time providing a better trained musician.

Figure 3:
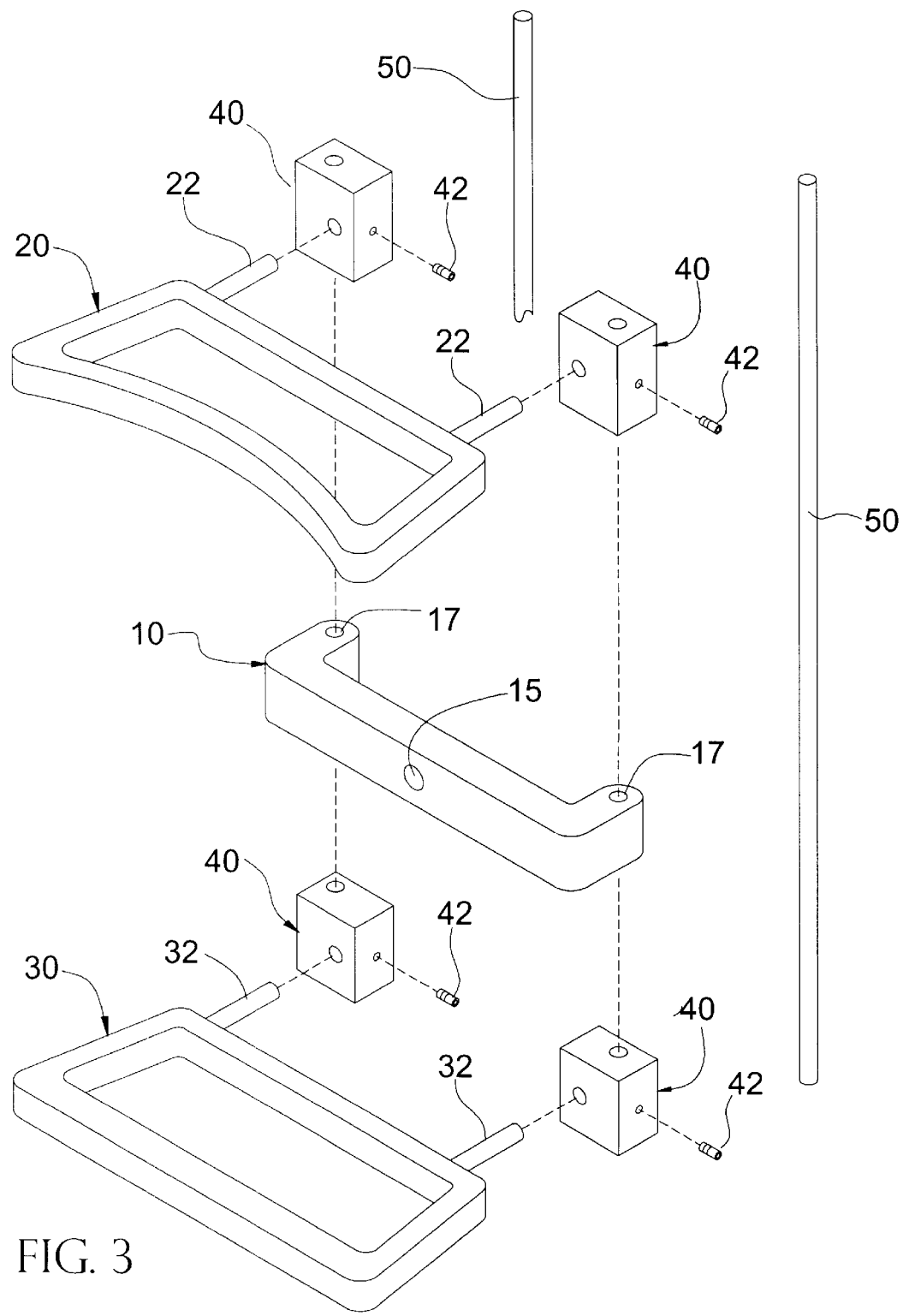
FIG. 3 is an exploded view of the embodiment shown in FIG. 1.

Turning now to FIG. 3, an exploded view of one embodiment of the device is shown. As will be evident to one of skill in the art, the entire device is preferably constructed of lightweight material, as the device will increase the weight already supported by the arms in holding the instrument. It has been found that central piece 10 and upper and lower portions 20, 30 may be formed from a lightweight plastic such as a molded polyurethane foam, and that support rods 50 and extension rods 22, 32 may be formed from a lightweight metal such as an aluminum material. Other materials may also be used to form the various parts of the present invention with sturdiness and weight being the primary concerns when selecting materials.

Central section 10 may be any shape that is useful for limiting the movement of the brass instrument along the longitudinal axis of the mouthpiece. As should be apparent, the movement of the instrument away from the user does not need to be restricted; only the movement towards the user's lips must be limited. The device illustrated in FIG. 3 provides this movement restriction by way of hole 15. The mouthpiece of the musical instrument will fit into hole 15, while the instrument is connected to the mouthpiece on the other side of hole 15. The hole 15 is preferably large enough to accept the mouthpiece stem, but too small for the mouthpiece or the horn to fit through. In this manner, central piece 10 will restrict the movement of the instrument both away from and towards the lips of the user. However, in this embodiment the instrument may still be moved away from the user because nothing prevents the entire device from moving away from the user along with the instrument. One particularly attractive aspect of this embodiment is that the instrument is only prevented from moving along the longitudinal axis 60 of the mouthpiece. The mouthpiece and instrument may still be manipulated along any axis perpendicular to the longitudinal axis 60, meaning that the mouthpiece may be pivoted around (both up-and-down and side-to-side) as desired by the musician. In this embodiment, hole 15 would act as a pivot point for the instrument, so that if the mouthpiece moves up, then the opposite end of the instrument would have to move down, in an opposite direction.

As one of skill in the art will appreciate, hole 15 may need to be different sizes to work effectively with different instruments. Preferably, the device may be marketed with a large hole 15 having a variety of inserts (not shown) that will alter the size of hole 15 to fit different instruments.

The upper and lower portions 20, 30 of the device are connected to central section 10 by use of support rods 50. In the embodiment shown in FIG. 3, the support rods 50 pass through holes 17 of the central section 10. Central section 10 may have a fixed location along the support rods 50, but is preferably adjustable along the vertical position of support rods 50. The position of central section 10 along the support rods may be fixed by way of a set screw (not shown) or any other known means to prevent sliding along a rod.

Support rods 50 may insert into connecting pieces 40 both above and below the central section 10. The purpose of the connecting pieces 40 in the illustrated embodiment is to provide an adjustable connection between the upper and lower portions 20, 30 and the support rods 50, so that the horizontal and vertical positions of the upper and lower portions 20, 30 with respect to the central section 10 may be adjusted by the user as desired. As shown, support rods 50 enter into vertical holes in the connecting pieces 40 and the position of the connecting pieces along the support rods 50 may be fixed via set screws 42 or any other known means for securing such pieces. In the illustrated embodiment the connecting pieces 40 would preferably be set parallel to their corresponding connecting piece, but such configuration may not be necessary. Upper portion 20 and lower portion 30 may then be attached to the connecting pieces 40 to provide the completed device.

As has been stated, the upper portion 20 is designed to contact the user's head. The upper portion 20 is preferably shaped to substantially fit the curvature of a user's forehead. In addition to being lightweight, the material used to construct upper portion 20 is preferably smooth and/or padded to minimize any discomfort caused by contacting the head. Lower portion 30 contacts the user's body, and therefore does not require the same attention to shaping and construction for the user's comfort. However, a lightweight, non-abrasive material is preferred, and the lower portion 30 may also be padded for comfort.

For the embodiment illustrated in FIG. 3, upper and lower portions 20, 30 are attached to their respective connecting pieces 40 by means of extension rods 22, 32. The extension rods are preferably made of similar material and design as the support rods 50, and may fit into horizontal holes within the connecting pieces in the same manner that the connecting rods 50 fit into vertical holes. In this manner, the upper and lower portions 20, 30 may be adjustable in the horizontal direction relative to the central section 10. The adjustability of the connecting pieces 40 along the support rods 50 supplies the vertical adjustability of the upper and lower portions 20, 30. Of the directional adjustments, the horizontal adjustment is probably more important as that will directly effect the proximity of the musical instrument mouthpiece to the user's lips.

In practice, the embodiment of the present invention illustrated herein may be utilized as follows. First the upper and lower portions 20, 30 are adjusted vertically, so that they contact the user in comfortable locations. The vertical adjustment is accomplished by sliding connecting pieces 40 to desired locations along support rods 50 and then securing the location of the connecting pieces. Next, with the instrument preferably within hole 15, central section 10 may be adjusted vertically along support rods 50 so that the mouthpiece is held in the proper location near the user's lips. Finally, the horizontal position of the upper and lower portions 20,30 should be secured by setting the position of the extension rods 22, 32 within connecting pieces 40. This is accomplished by placing the horn in its most extended position toward the user's lips, and finding the horizontal position of the upper and lower portions 22, 32 that will allow the lips to contact the mouthpiece with appropriate pressure.

As may be appreciated, the use of both upper 20 and lower 30 securing portions is preferred as this will prevent the user from bending his neck or torso in such a manner as to create excess mouthpiece pressure.

The above description and examples of the present invention are not intended to be limiting, and it is recognized that one of skill in the art will readily discern variations of this description that are intended to be included within the spirit and scope of this invention.

Having set forth the nature of the present invention, what is claimed is:

1. A device for positioning a musical instrument, said instrument including a mouthpiece and said mouthpiece including a longitudinal axis along its length, so that a user avoids excess pressure between said user's lips and said mouthpiece comprising:
    a) a central section for holding said musical instrument and restricting movement of said instrument along said longitudinal axis of said mouthpiece;
    b) an upper portion rigidly connected to said central section, said upper portion configured to contact said user's head;
    c) a lower portion rigidly connected to said central section, said lower portion configured to contact said user at a location below said user's lower lip; and
    wherein said upper and lower portions extend outwardly beyond said mouthpiece such that said upper and lower portions contact said user and substantially limit the proximity of said central section to said user's lips.

2. The device of claim 1 wherein the positions of said upper and lower portions with respect to the central section are adjustable.

3. The device of claim 1 wherein the vertical position of said upper portion relative to the central section is adjustable.

4. The device of claim 1 wherein the horizontal position of said upper portion relative to the central section is adjustable.

5. The device of claim 1 wherein the vertical position of said lower portion relative to the central section is adjustable.

6. The device of claim 1 wherein the horizontal position of said lower portion relative to the central section is adjustable.

7. The device of claim 1 wherein the horizontal and vertical positions of said upper and lower portions with respect to the central section are adjustable.

8. The device of claim 1 further comprising at least one support member connected to said central section, said support member serving as the rigid connection between the central section and the upper portion.

9. The device of claim 8 wherein the upper portion is adjustably connected to the support member.

10. The device of claim 1 further comprising at least one support member connected to said central section, said support member serving as the rigid connection between the central section and the lower portion.

11. The device of claim 10 wherein the lower portion is adjustably connected to the support member.

12. A device for positioning a musical instrument of the brass horn family, said instrument including a mouthpiece and said mouthpiece including a longitudinal axis along its length, so that a user avoids excess pressure between said user's lips and said mouthpiece comprising:
    a) a central section that holds said musical instrument and restricts movement of said instrument along said longitudinal axis of said mouthpiece;
    b) an upper support member connected to said central section;
    c) a lower support member connected to said central section;
    d) an upper portion connected to said upper support member, said upper portion configured to contact said user's head;
    e) a lower portion connected to said lower support member, said lower portion configured to contact said user at a location below said user's lower lip; and
    wherein said upper and lower portions extend outwardly beyond said mouthpiece such that said upper and lower portions will contact said user and substantially limit the proximity of said central section to said user's lips.

13. The device of claim 12 wherein said upper and lower support members are comprised of a single main support member that passes through the central section, such that the upper portion of the main support member comprises the upper support member, and the lower portion of the main support member comprises the lower support member.

14. The device of claim 13 wherein the central section is adjustably connected to the main support member, so that the position of the central section along the main support member may be adjusted.

15. The device of claim 12 wherein the upper portion is adjustably connected to the upper support member, so that the distance between the upper portion and the central section may be adjusted.

16. The device of claim 12 wherein the lower portion is adjustably connected to the lower support member, so that the distance between the lower portion and the central section may be adjusted.

17. The device of claim 12 further comprising an upper connecting piece, said upper connecting piece providing the adjustable connection between the upper portion and the upper support member.

18. The device of claim 17 wherein said upper connecting piece is slidably connected to the upper support member such that the distance between the upper connecting piece and the central section may be adjusted.

19. The device of claim 18 wherein said upper portion is adjustably connected to the upper connecting piece so that the upper portion may be adjusted in a direction substantially parallel to the longitudinal axis of the instrument mouthpiece.

20. The device of claim 12 further comprising a lower connecting piece, said lower connecting piece providing the adjustable connection between the lower portion and the lower support member.

21. The device of claim 20 wherein said lower connecting piece is slidably connected to the lower support member such that the distance between the lower connecting piece and the central section may be adjusted.

22. The device of claim 21 wherein said lower portion is adjustably connected to the lower connecting piece so that the lower portion may be adjusted in a direction substantially parallel to the longitudinal axis of the instrument mouthpiece.

23. A device for positioning a musical instrument of the brass horn family, said instrument including a mouthpiece and said mouthpiece including a longitudinal axis along its length, so that a user avoids excess pressure between said user's lips and said mouthpiece comprising:
  a) a central section that holds said musical instrument and restricts movement of said instrument along said longitudinal axis of said mouthpiece;
  b) an upper support member connected to said central section;
  c) an upper connecting piece connected to said upper support member;
  d) an upper portion connected to said upper connecting piece, said upper portion configured to contact said user's head;
  e) a lower support member connected to said central section;
  f) a lower connecting piece connected to said lower support member;
  g) a lower portion connected to said lower connecting piece, said lower portion configured to contact said user at a location below said user's lower lip; and
  wherein said upper and lower portions extend outwardly beyond said mouthpiece such that said upper and lower portions will contact said user and substantially limit the proximity of said central section to said user's lips.

24. The device of claim 23 wherein said upper and lower support members are comprised of a single main support member that passes through the central section, such that the upper portion of the main support member comprises the upper support member, and the lower portion of the main support member comprises the lower support member.

25. The device of claim 24 wherein the central section is adjustably connected to the main support member, so that the position of the central section along the main support member may be adjusted.

26. The device of claim 23 wherein said upper connecting piece is slidably connected to the upper support member such that the distance between the upper connecting piece and the central section may be adjusted.

27. The device of claim 26 wherein said upper portion is adjustably connected to the upper connecting piece so that the upper portion may be adjusted in a direction substantially parallel to the longitudinal axis of the instrument mouthpiece.

28. The device of claim 23 wherein said lower connecting piece is slidably connected to the lower support member such that the distance between the lower connecting piece and the central section may be adjusted.

29. The device of claim 28 wherein said lower portion is adjustably connected to the lower connecting piece so that the lower portion may be adjusted in a direction substantially parallel to the longitudinal axis of the instrument mouthpiece.

30. A device for positioning a musical instrument of the brass horn family, said instrument including a mouthpiece and said mouthpiece including a longitudinal axis along its length, so that a user avoids excess pressure between said user's lips and said mouthpiece comprising:
  a) means for holding said musical instrument, said holding means adapted to restrict movement of said instrument along said longitudinal axis of said mouthpiece;
  b) upper means for preventing said holding means from approaching said user's lips, said upper preventing means designed to contact said user's head; and
  c) lower means for preventing said holding means from approaching said user's lips, said lower preventing means designed to contact said user at a location below said user's lip.

31. The device of claim 30 wherein said upper and lower preventing means are adjustably connected to said holding means.

32. The device of claim 31 wherein said holding means includes a rigid support member and wherein said upper preventing means is adjustably connected to said rigid support member.

33. The device of claim 31 wherein said holding means includes a rigid support member and wherein said lower preventing means is adjustably connected to said rigid support member.

34. The device of claim 32 wherein the rigid support member is comprised of metal.

35. The device of claim 33 wherein the rigid support member is comprised of metal.

36. The device of claim 30 wherein the holding means and upper and lower preventing means are comprised of resilient plastic material.

37. The device of claim 30 wherein the upper and lower preventing means and the holding means are comprised of a hardened polyurethane foam.

38. A device for positioning a musical instrument having a mouthpiece, said mouthpiece including a longitudinal axis along its length, so that a user avoids excess pressure between said user's lips and said mouthpiece comprising:
  a) a first support rod and a second support rod;
  b) a central section having means for holding said musical instrument, said holding means preventing substantial movement of said musical instrument along said longitudinal axis of said mouthpiece, said central section including holes through which said first and second support rods pass so that said central section may slide along said first and second support rods;

c) a first upper connecting piece slidably connected to a portion of said first support rod extending upward from said central section so that the distance between said first upper connecting piece and said central section is adjustable;

d) a second upper connecting piece slidably connected to a portion of said second support rod extending upward from said central section so that the distance between said second upper connecting piece and said central section is adjustable;

e) an upper portion configured to contact said user's head, said upper portion having a first upper portion extension rod and a second upper portion extension rod, said first and second upper portion extension rods adjustably connected to said first and second upper connecting pieces such that said upper portion is adjustable in a direction substantially parallel to said longitudinal axis of said mouthpiece;

f) a first lower connecting piece slidably connected to a portion of said first support rod extending downward from said central section so that the distance between said first lower connecting piece and said central section is adjustable;

g) a second lower connecting piece slidably connected to a portion of said second support rod extending downward from said central section so that the distance between said second lower connecting piece and said central section is adjustable;

h) a lower portion configured to contact said user at a location below said user's lower lip, said lower portion having a first lower portion extension rod and a second lower portion extension rod, said first and second lower portion extension rods adjustably connected to said first and second lower connecting pieces such that said lower portion is adjustable in a direction substantially parallel to said longitudinal axis of said mouthpiece; and wherein said upper and lower portions extend outwardly beyond said mouthpiece such that said upper and lower portions will contact said user and substantially limit the proximity of said central section to said user's lips.

39. A device for positioning a musical instrument having a mouthpiece, said mouthpiece including a longitudinal axis along its length, so that a user avoids excess pressure between said user's lips and said mouthpiece comprising:

a) means for securing said musical instrument to limit movement of said instrument along said longitudinal axis of said mouthpiece, said securing means including means for holding said instrument near said mouthpiece in a manner that prevents said instrument from moving in a direction toward said mouthpiece; and, b) means for preventing said securing means from approaching said users lips, said preventing means comprising stoppers that contact said user's body, said stoppers being rigidly connected to said securing means so that said securing means is prevented from approaching said user's lips.

40. A device for positioning a musical instrument having a mouthpiece, said mouthpiece including a longitudinal axis along its length, so that a user avoids excess pressure between said user's lips and said mouthpiece comprising:

a) means for securing said musical instrument and said mouthpiece together so that movement of said instrument and said mouthpiece relative to one another along said longitudinal axis is prevented; and, b) means in contact with said user's body for preventing said securing means from approaching said users lips beyond a preselected distance.

* * * * *